(12) United States Patent
Yamasaki

(10) Patent No.: US 7,472,942 B2
(45) Date of Patent: Jan. 6, 2009

(54) SIDE STRUCTURE FOR VEHICLE BODY

(75) Inventor: Hiroki Yamasaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 237 days.

(21) Appl. No.: 11/350,804

(22) Filed: Feb. 10, 2006

(65) Prior Publication Data

US 2006/0197359 A1    Sep. 7, 2006

(30) Foreign Application Priority Data

Feb. 24, 2005    (JP) .............................. 2005-048379

(51) Int. Cl.
*B60J 5/00*    (2006.01)
(52) U.S. Cl. .................. 296/146.11; 296/202
(58) Field of Classification Search ............ 296/146.11, 296/202; 16/242, 236, 238, 245, 241, 246, 16/335
See application file for complete search history.

(56) References Cited

FOREIGN PATENT DOCUMENTS

| GB | 1 444 790 | 8/1976 |
|---|---|---|
| JP | 10-119574 | 5/1998 |
| JP | 11-310036 | 11/1999 |

OTHER PUBLICATIONS

Chinese Office Action dated Sep. 7, 2007.

*Primary Examiner*—Lori L Lyjak
(74) *Attorney, Agent, or Firm*—Finnegan, Henderson, Farabow, Garrett & Dunner, LLP

(57) ABSTRACT

A vehicle side portion structure, which is applied to a vehicle body, has a pillar that is arranged at the side of a vehicle body and which extends in the substantially up and down directions of the vehicle; and a side door turnably supported around a door hinge attached to pillar. A preset gap is set between the surfaces of the pillar and the side door that face each other. A load-conveying component is provided at the gap or vicinity thereof, and this suppresses the rotational displacement of the pillar around the door hinge when a frontal collision load is input and makes the frontal collision load act upon the side door as an axial force towards the rear side of the vehicle.

20 Claims, 10 Drawing Sheets

SIDE STRUCTURE FOR VEHICLE BODY

CROSS-REFERENCE TO RELATED APPLICATION

This application claims priority under 35 U.S.C. 119 from Japanese Patent Application No. 2005-048379, the disclosure of which is incorporated by reference herein.

BACKGROUND OF THE INVENTION

1. Field of the Invention

The present invention relates to a side structure of a vehicle body. More specifically, the present invention relates to vehicle body side portion structure applied to a vehicle body including a side door turnably supported around a door hinge attached to a pillar. The structure has a preset gap between the surfaces of the pillar and the side door which face each other, and the centroid position of the cross-sectional surface of the side door is arranged so as to be offset towards the exterior side in the vehicle widthwise direction relative to the centroid position of the cross-sectional surface of the pillar.

2. Description of the Related Art

A technology has been disclosed in the Official Gazette of Japanese Patent Application Laid-Open (JP-A) No. 11-310036 that deals with effectively absorbing load of impact at the time of a frontal collision. A bracket made from sheet material is provided at the front end portion of the front side door. The front edge portion of the bracket is fastened to a door hinge while being joined with the front edge portion of an impact beam extending towards the rear side of the vehicle from the middle portion of this bracket. The rear end portion of the bracket is joined to a surface on the side of a door panel towards the interior of the vehicle cab.

Due to the above-described configuration, when the load of impact at the time of frontal collision is inputted to the front side door via the front pillar and door hinge, the load inputted into the front side door can be stopped at the impact beam because the front end portions of the door hinge and impact beam are arranged at approximately the same place in the widthwise direction. As a result, deformation of the front side door can be suppressed.

The above-described prior art, however, could be improved in the following areas.

Generally, the centroid position of the cross-sectional surface of the front side door is offset (i.e., shifted) towards the exterior side of the vehicle in the widthwise direction relative to the centroid position of the cross-sectional surface of the pillar. Further, a preset gap is set between the front surface of the front side door and the rear end surface of the front pillar. When there is a frontal collision, the front pillar rotates around a door hinge until the rear end surface of the front pillar interferes with the front surface of the front side door. In the middle of that rotation, the door hinge hits the front surface of the front side door and after this contact occurs a bending moment (i.e., bending moment bending the front side door towards the exterior side of the vehicle cab) acts upon the front side door towards the external side in the vehicle widthwise direction. This point also applied to the above-mentioned prior art.

In light of the above-described background, the proposal of a structure that effectively restrains deformation of a vehicle frame at the time of frontal collision has been desired.

Further, a door device is disclosed in the Official Gazette of JP-A No. 10-119574 where a latch supported at the turning end side of the door panel meshes with a striker on the vehicle body side, whereby the door is closed. When this meshing action is released, the door is opened or released. Nonetheless, this device is not able to provide the above-described desired proposal.

SUMMARY OF THE INVENTION

The present invention was created in light of the above-described circumstances, and was made to provide a side portion structure for a vehicle body that can effectively restrain or suppress vehicle frame deformation at the time of a frontal collision.

A first aspect of the present invention provides a vehicle side portion structure, which is applied to a vehicle body, comprising: a side door turnably supported around a door hinge attached to a pillar that is arranged at the side of a vehicle body and extends in the substantially up and down directions of the vehicle; a preset gap between the surfaces of the pillar and the side door that face each other, and in which a centroid position of the cross-sectional surface of the side door is arranged so as to be offset towards the exterior side in the vehicle widthwise direction relative to a centroid position of the cross-sectional surface of the pillar; and a load-conveying component provided at the gap or in the vicinity thereof that suppresses the rotational displacement of the pillar around the door hinge when a frontal collision load is input. This component makes the frontal collision load act upon the side door as an axial force towards the rear side of the vehicle.

A second aspect of the present invention provides a vehicle side portion structure, which is applied to a vehicle body, comprising: a side door turnably supported around a door hinge attached to a pillar that is arranged at the side of a vehicle body and which stands longitudinally in the substantially up and down directions of the vehicle; a preset gap between the surfaces of the pillar and the side door that face each other, and in which a centroid position of the cross-sectional surface of the side door is arranged so as to be offset towards the exterior side in the vehicle widthwise direction relative to a centroid position of the cross-sectional surface of the pillar; and a load-conveying component provided at the gap or in the vicinity thereof that suppresses the rotational displacement of the pillar around the door hinge when frontal collision load is input and that makes the frontal collision load act upon the side door as an axial force towards the rear side of the vehicle. The load-conveying component is configured to block or dampen the door hinge from hitting the door hinge side surface of the side door when the pillar rotationally displaces around the door hinge. The load-conveying component is arranged closer to the vehicle interior side than the door hinge, and is provided at a position along the door belt line.

Other aspects, features and advantages of the present invention will become apparent from the following descriptions taken in conjunction with the accompanying drawings.

BRIEF DESCRIPTION OF THE INVENTION

Preferred embodiments of the present invention will be described in detail based on the following figures, in which.

DETAILED DESCRIPTION OF THE INVENTION

First Embodiment

Figure 1:
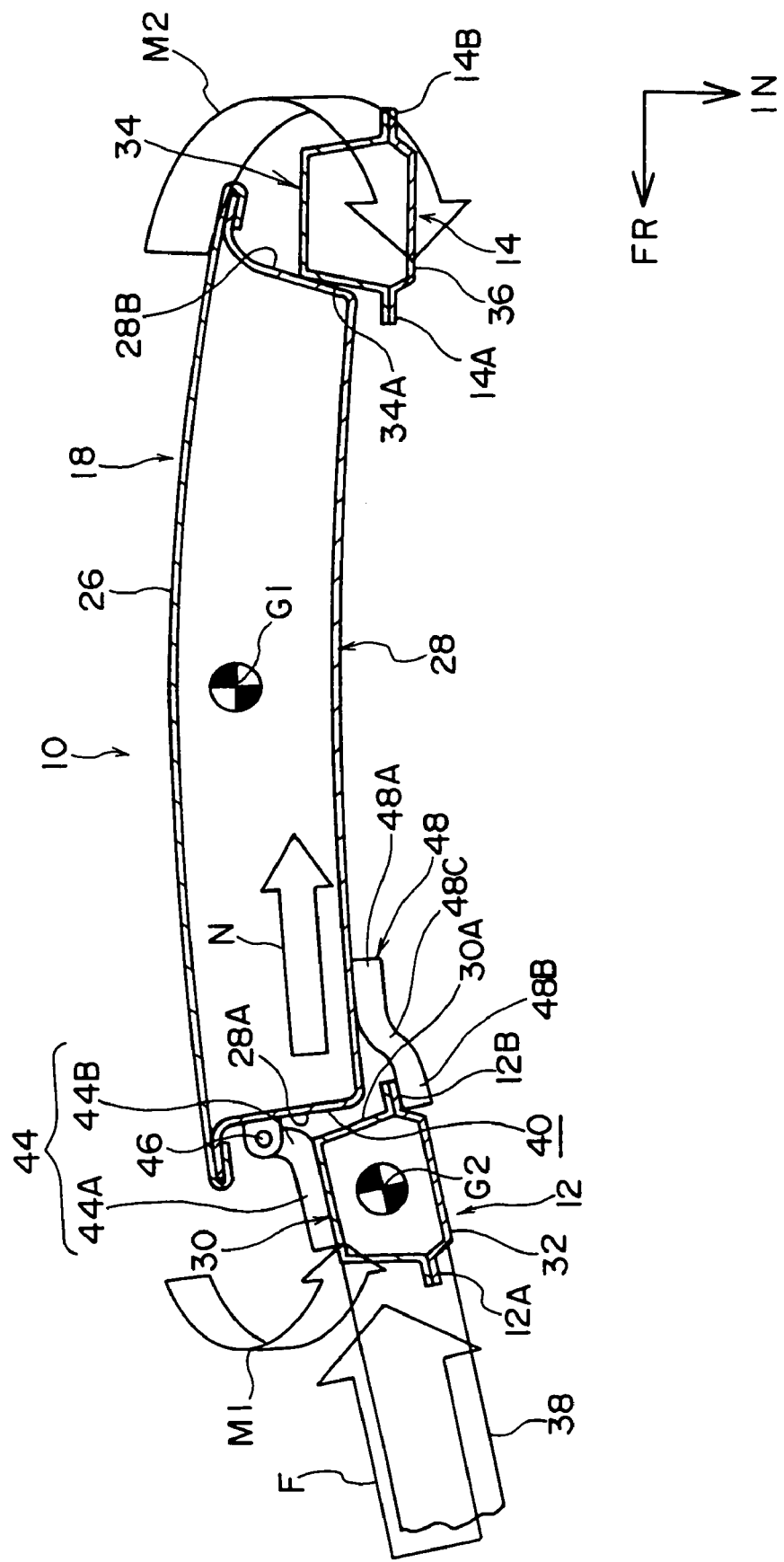
FIG. 1 is a cross-sectional drawing of the overall configuration of the vehicle body side structure according to a first embodiment of the present invention showing the state of the structure after a frontal collision.

Hereafter, the vehicle body side portion structure of the first embodiment of the present invention will be explained using FIGS. 1-4. It should be noted that the arrows in the drawings marked FR indicate the direction of the front side of the vehicle, the arrows marked UP indicate the upper side direction of the vehicle, and the arrows marked IN indicate the direction of the interior of the vehicle in the widthwise direction.

Figure 2:
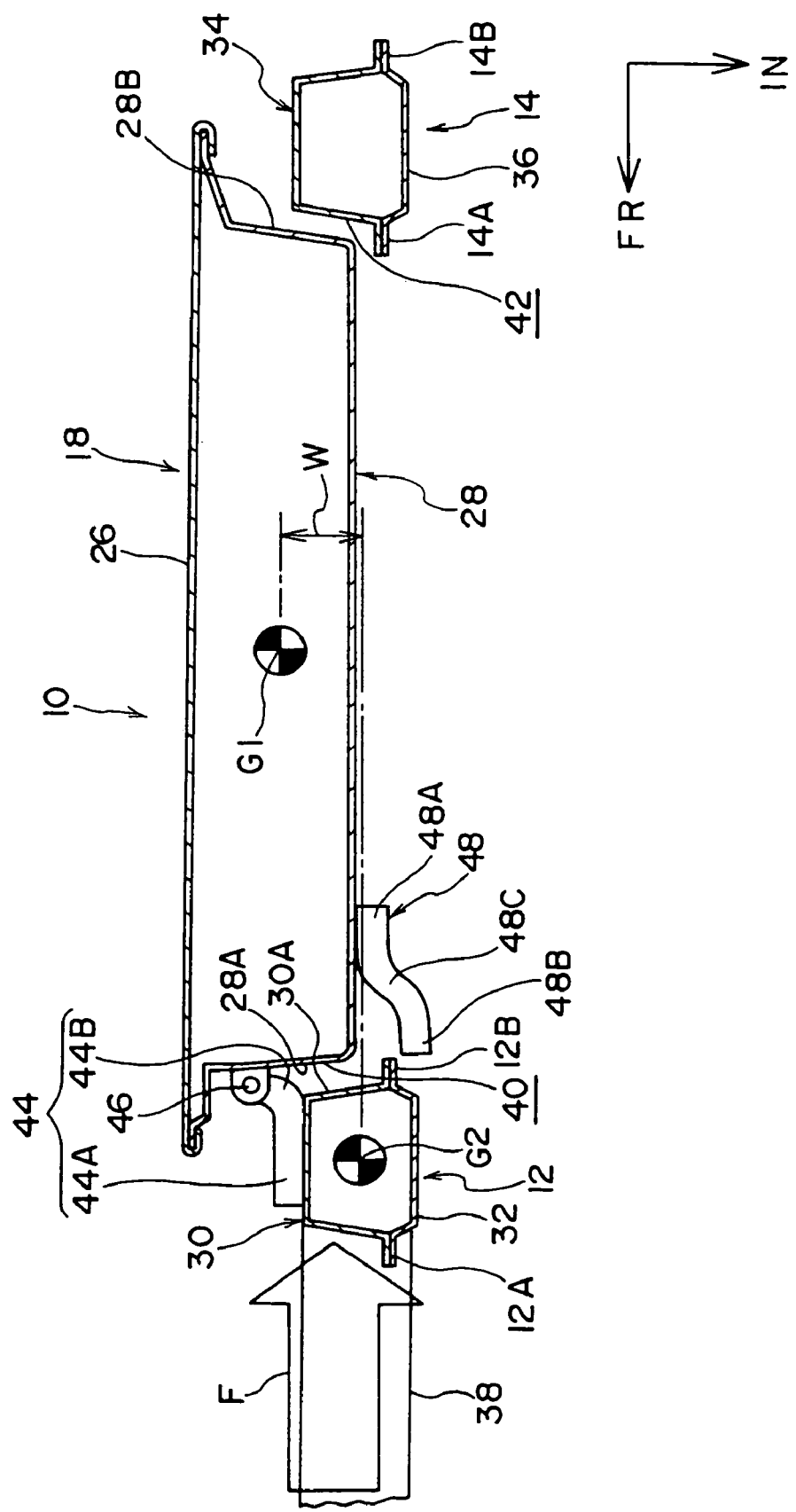
FIG. 2 is a cross-sectional drawing (i.e., along the line I-I shown in FIG. 4) of the overall configuration of the vehicle body side structure according to a first embodiment of the present invention showing the state of the structure prior to a frontal collision.
Figure 4:
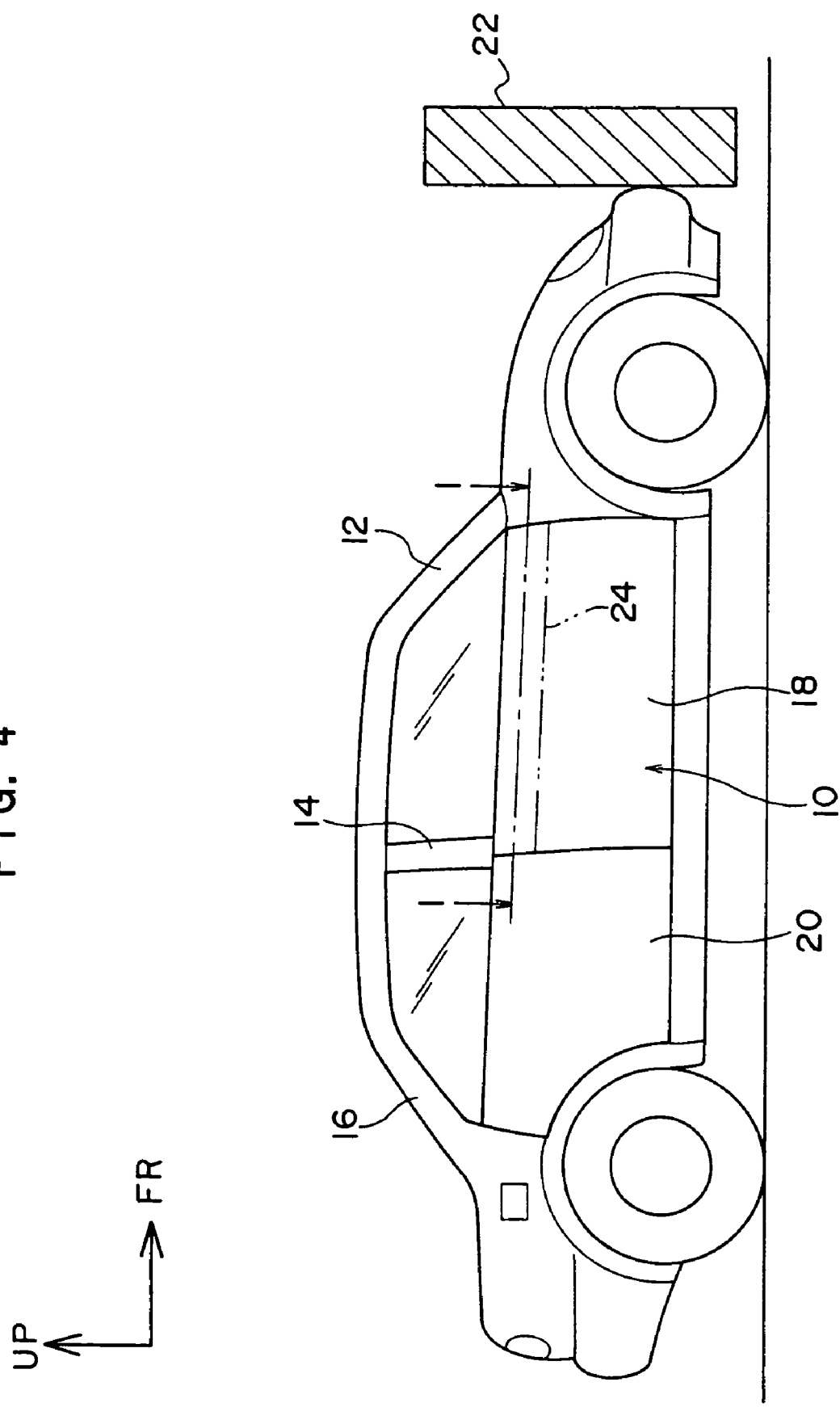
FIG. 4 is a lateral view drawing of a vehicle showing the belt line thereof.

A cross-sectional drawing is shown in FIG. 1 showing the state of the overall configuration of the vehicle body side structure according to the present embodiment after a frontal collision. Also, a cross-sectional drawing is shown in FIG. 2 showing the state of the overall configuration of the vehicle body side structure prior to a frontal collision. Further, a lateral view drawing of a vehicle is shown in FIG. 4.

As shown in these drawings, a front pillar 12, a center pillar 14, and a rear pillar 16 (see FIG. 4) are arranged in this order in the front, center, and rear portions of a vehicle body side structure 10. These extend along the substantially up and down directions of the vehicle. A front side door 18 is provided between the front pillar 12 and the center pillar 14, and further, a rear side door 20 is arranged between the center pillar 14 and the rear pillar 16 (see FIG. 4). A state is shown in FIG. 4 where the front end portion of the vehicle is in contact with a barrier 22.

A line along the upper edges of the main body portions of the doors of the front side door 18 and the rear side door 20 of the above-described vehicle body side structure 10 is the belt line 24. (Note: Only the belt line 24 of the front side is shown in FIG. 4.) Hereafter, the main portions of the present embodiments will be explained based on FIGS. 1-3, in which a state has been drawn where the belt line 24 on the front side door 18 side has been cut horizontally and is viewed from the upper side of the vehicle.

As shown in FIG. 2, the front side door 18 has a structure that includes a door outer panel 26 arranged at the exterior side of the vehicle cab and a door inner panel 28 arranged on the interior side of the vehicle cab. The door inner panel 28 is configured with hemming processing to be unified with the door outer panel 26 and to form a closed cross-sectional surface.

The front pillar 12 that is a component of the vehicle framework is formed in a hollow pillar shape from a pillar outer panel 30 and a pillar inner panel 32 and extends substantially along the up and down directions of the vehicle at the forward side of the front side door 18. A front end flange 12A and rear end flange 12B configured to conform with the terminal portions of each of the panels are arranged at the front end and rear end portions of the front pillar 12. These are arranged so as to respectively face the front and rear directions. It should be noted that there are cases where pillar reinforcements are provided in the cross-sectional surfaces formed in the closed cross-sectional structures of the pillar outer panel 30 and the pillar inner panel 32.

Similarly, the center pillar 14 that is a component of the vehicle framework is formed in a hollow pillar shape from a pillar outer panel 34 and a pillar inner panel 36 and extends substantially along the up and down directions of the vehicle at the rear side of the front side door 18. A front edge flange 14A and rear end flange 14B configured to conform with the terminal portions of each of the panels are arranged at the front end and rear end portions of the center pillar 14. These are arranged so as to face the front and rear directions. It should be noted that there are cases where pillar reinforcements are provided in the cross-sectional surfaces formed in the closed cross-sectional structures of the pillar outer panel 34 and the pillar inner panel 36.

Furthermore, the rear end portion of an apron upper member 38 arranged in the longitudinal direction is joined at the substantially central portion of the above-described front pillar 12 in the longitudinal direction. The apron upper member 38 extends longitudinally in the front and rear directions of the vehicle at an upper portion of the side of the front of the vehicle body. The apron upper member 38 is formed so as to be elongated and is a component that receives (i.e., absorbs or is the recipient of) the load of impact towards the rear side of the vehicle at a time of frontal collision.

Here, the positional relations of each of the above-described components will be explained. A rear end surface 30A of the pillar outer panel 30 of the front pillar 12 and a front surface 28A acting as the side end surface of the door hinge of the door inner panel 28 of the front side door 18 are arranged to face each other front and rear. A preset gap 40 is provided between these surfaces. Similarly, a front surface 34A of the pillar outer panel 34 of the center pillar 14 and a rear end surface 28B of the door inner panel 28 of the front side door 18 are arranged to face each other front and rear. A preset gap 42 is provided between these surfaces (refer to FIG. 2).

Furthermore, a centroid position G1 in the cross-sectional drawing of the above-described front side door 18 is arranged so as to be offset from a centroid position G2 in the cross-sectional drawing of the front pillar 12 by a preset distance W towards the exterior side of the vehicle in the widthwise direction.

Under the above-described positional relations, there is a front portion 44A (i.e., the portion that extends along the front-to-rear direction of the vehicle) of a door hinge 44 that is formed to be substantially L-shaped when seen in plan view. This front portion 44A is fixed to the outer side surface of the pillar outer panel 30 of the front pillar 12 with a fixing device (not shown) such as nuts and bolts. Also, a rear portion 44B (i.e., the portion that extends along the widthwise direction of the vehicle) of the door hinge 44 is axially supported so as to be turnable on a hinge pin 46 provided on the side of the front surface 28A of the door inner panel 28 of the front side door 18. Due to this, the front side door 18 is turnable (i.e., can open and close) around the door hinge 44 (i.e., the hinge pin 46) within the horizontally plane, and thus comprises what is known as a swing-type side door.

Here, a high-strength load-conveying component 48 is arranged on the front end side of the door inner panel 28 of the above-described front side door 18 (i.e., at a position in the vicinity of the gap 40). This load-conveying component 48 acts as a load conveying means on the belt line 24 and as a means for preventing hitting of the door hinge. The load-conveying component 48 is a bracket-formed component shaped to be approximately a flattened S shape when seen from plan view. The load-conveying component 48 can be formed by bending thick sheet material or U-section sheet material.

One end portion (rear end portion) 48A of the load-conveying component 48 structured as described above is fixed to the door inner panel 28 at the surface facing the interior of the vehicle cab by joining with bolts or welding. Further, the other (front) end portion 48B of the load-conveying component 48 is arranged at a position separated by a preset distance from the inside of the vehicle cab via a central portion 48C separated from the surface of the door inner panel 28. Accordingly, the load-conveying component 48 is supported by the door inner panel 28 as a cantilever. Due to this, the front end portion 48B of the load-conveying component 48 is arranged in a state where it is in proximity with the inside of the vehicle cab interior at the rear end flange 12B of the front pillar 12 (this is in a state of no-contact where it does not touch the rear end flange 12B, in order to allow for the opening and closing action of the front side door 18).

Next, the operation and effect of the present embodiment will be explained.

The state shown in FIG. 2 is that prior to a frontal collision. When a frontal collision with the barrier 22 (see FIG. 4) occurs from this state, a load of impact F is inputted to the apron upper member 38, arranged longitudinally in the front-to-rear direction of the vehicle at both sides of the front portion of the vehicle, and conveyed to the front pillar 12.

Figure 3:
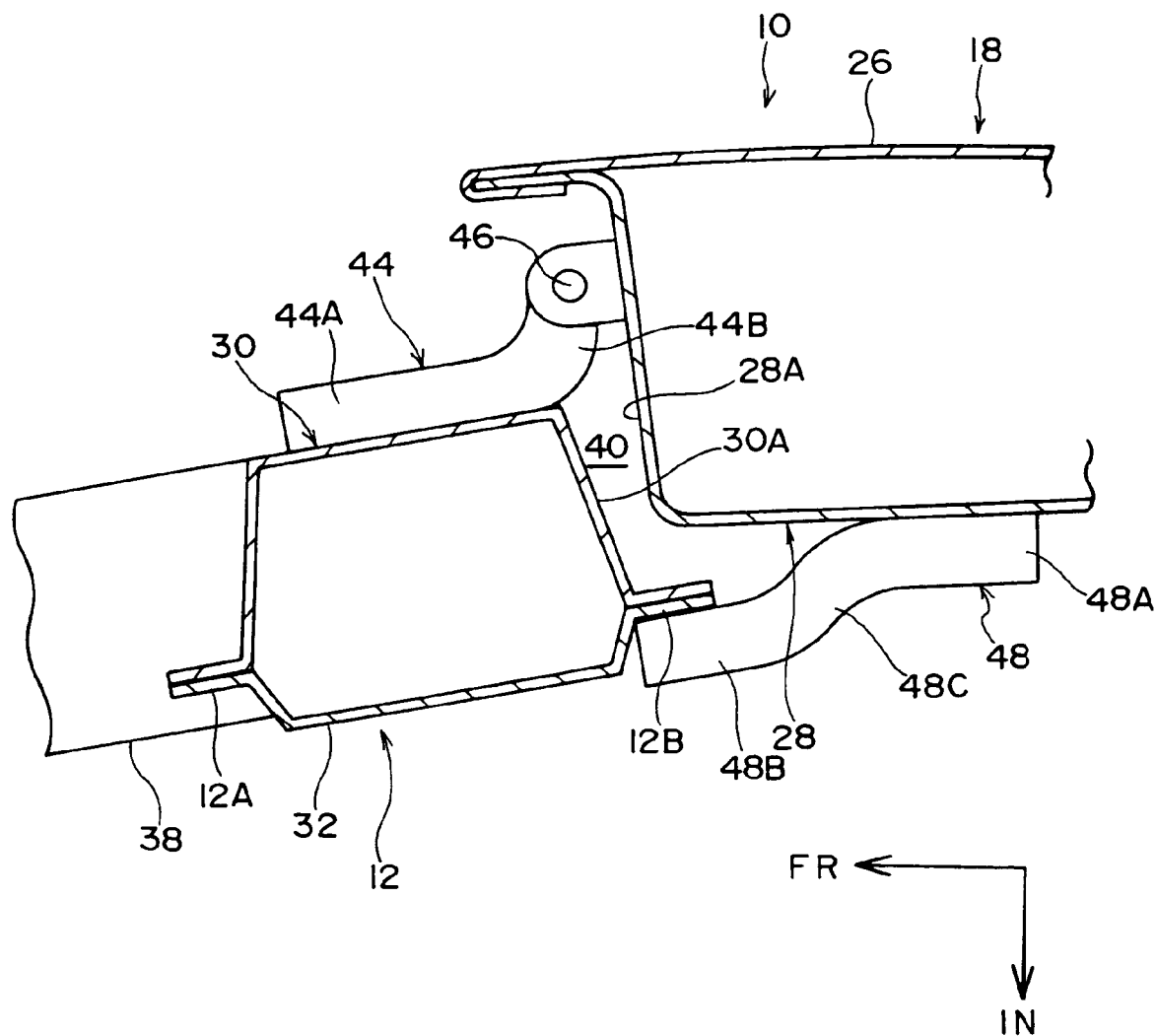
FIG. 3 is an enlarged cross-sectional drawing of the main portions of the first embodiment of the present invention shown in FIG. 1.

Here, the preset gap 40 is provided between the opposing surfaces of the front pillar 12 and front side door 18. Also, the centroid position G1 in the cross-sectional surface of the front side door 18 is arranged so as to be offset from the centroid position G2 in the cross-sectional surface of the front pillar 12 towards the exterior side of the vehicle in the widthwise direction. For these reasons, when the impact load F towards the rear direction of the vehicle is inputted to the front pillar 12, the front pillar 12 rotatably displaces towards the inside of the vehicle cab interior in the direction that collapses the gap 40 around the hinge pin 46 of the door hinge 44, as shown in FIGS. 1 and 3. When a preset amount of rotation displacement is exceeded, bending moment is generated in the same direction as the direction of rotation displacement of the front pillar 12 to the front side door 18, thus acting to bend the front side door 18 (i.e., acting to deform the central portion of the front side door 18 in the front-to-rear direction towards the outer side of the vehicle's widthwise direction).

However, with the present embodiment, the load-conveying component 48 is provided at the front end side of the door inner panel 28 of the front side door 18 so when the front pillar 12 rotationally displaces around the hinge pin 46 of the door hinge 44 towards the side of the interior of the vehicle cab, the rear end flange 12B of the front pillar 12 comes into contact and latches with the front end portion 48B of the load-conveying component 48. The rear end portion 48A of the load-conveying component 48 is firmly fixed to the door inner panel 28 and the load-conveying component 48 is itself also formed from a high-strength component so the front pillar 12 cannot rotationally displace towards the interior of the vehicle any more than this. The amount of rotational displacement of the front pillar 12 around the door hinge 44 (i.e., the hinge pin 46) is thus restricted (i.e., decreased). Accordingly, the bending moment M1 acting upon the front side door 18 from the front pillar 12 is suppressed to a minimum and an axial force N increases by that amount and acts towards the rear direction of the vehicle upon the front side door 18 via the load-conveying component 48. It should be noted that normally a bending moment M2 (>M1) acts upon the center pillar 14 side.

That is, with the present embodiment, the bending moment M1 that bends the front side door 18, caused by the load of impact F that acts upon the front side door 18 at the time of a frontal collision, is reduced or suppressed. That amount of suppressed moment is made to act upon the front side door 18 in the rear direction of the vehicle as the axial force N, whereby the frontal collision load of impact F inputted to the vehicle body side structure 10 can be channeled towards the rear side of the vehicle with good efficiency. In other words, with the present embodiment, a new load-conveying route can be provided between the front pillar 12 and the front side door 18 via the bracket-shaped load-conveying component 48. As a result, deformation of the vehicle frame at the time of frontal collision can be effectively suppressed with the present embodiment.

In addition, the above-described phenomenon can be explained with further accuracy as follows. With the present embodiment, the front pillar 12 rotationally displaces around the hinge pin 46 of the door hinge 44 towards the interior of the vehicle cab. The rear portion 44B of that door hinge 44 constrains the rotational displacement of the front pillar 12 with the load-conveying component 48 before hitting the front surface 28A, that is the end surface of the door hinge side of the front side door 18, occurs. For this reason, the generation of bending moment M1 towards the front side door 18 can be effectively suppressed and the functional capability of conveying it (i.e., channeling the load) towards the rear side of the vehicle as axial force N is enhanced. As a result, with the present embodiment, the precision and reliability of effective suppression of vehicle frame deformation at the time of a frontal collision can be increased.

Additionally, with the present embodiment, the front end portion 48B of the load-conveying component 48 was arranged in the proximity of the inside of the vehicle cab interior at the rear end flange 12B of the front pillar 12 so when the front pillar 12 rotationally displaces slightly at the time of a frontal collision, the rear end flange 12B interferes or impedes with the front end portion 48B of the load-conveying component 48. When considered differently, even if the front side door 18 tries to displace towards the exterior side in the widthwise direction of the vehicle, the front end portion 48B of the load-conveying component 48 is latched to the rear end flange 12B of the front pillar 12, so this can also function to suppress displacement (i.e., movement in the lateral direction) of the front side door 18 towards the exterior side in the widthwise direction of the vehicle when there is a frontal collision.

Furthermore, with the present embodiment, the load-conveying component 48 is arranged closer towards the interior side of the vehicle cab than the door hinge 44 so it is easy to set a structure that interrupts or contains the rotational displacement of the front pillar 12. As a result, a configuration (e.g., shape) for the load-conveying component 48 that is most suited to that particular vehicle type can be selected.

Also, as an item related to the above-described effect, with the present embodiment, the load-conveying component 48 can be set without narrowing the gap 40, so this component can be attached afterwards without having to add any changes to the conventional side structure of a vehicle body at the design stage.

Furthermore, with the present embodiment, the load-conveying component 48 was set at a position along the door belt line 24 so deformation of the vehicle frame can be effectively suppressed. That is, the inputting of the load of impact at the time of frontal collision towards the rear side of the vehicle in order to suppress vehicle frame deformation also has an effect in that it reinforces a relatively large region. Here, with the present embodiment, the load-conveying component 48 was set in a position along the door belt line 24 to which it is easy for a relatively large load of impact to enter from the front portion of the vehicle to the vehicle body side structure 10. Due to this configuration, the bending moment M1 deforming the central portion of the front side door 18 in the front-to-rear direction towards the exterior of the cab can be effectively suppressed, and the load of impact can be effectively channeled towards the rear direction of the vehicle as an axial force.

Second Embodiment

Figure 5:
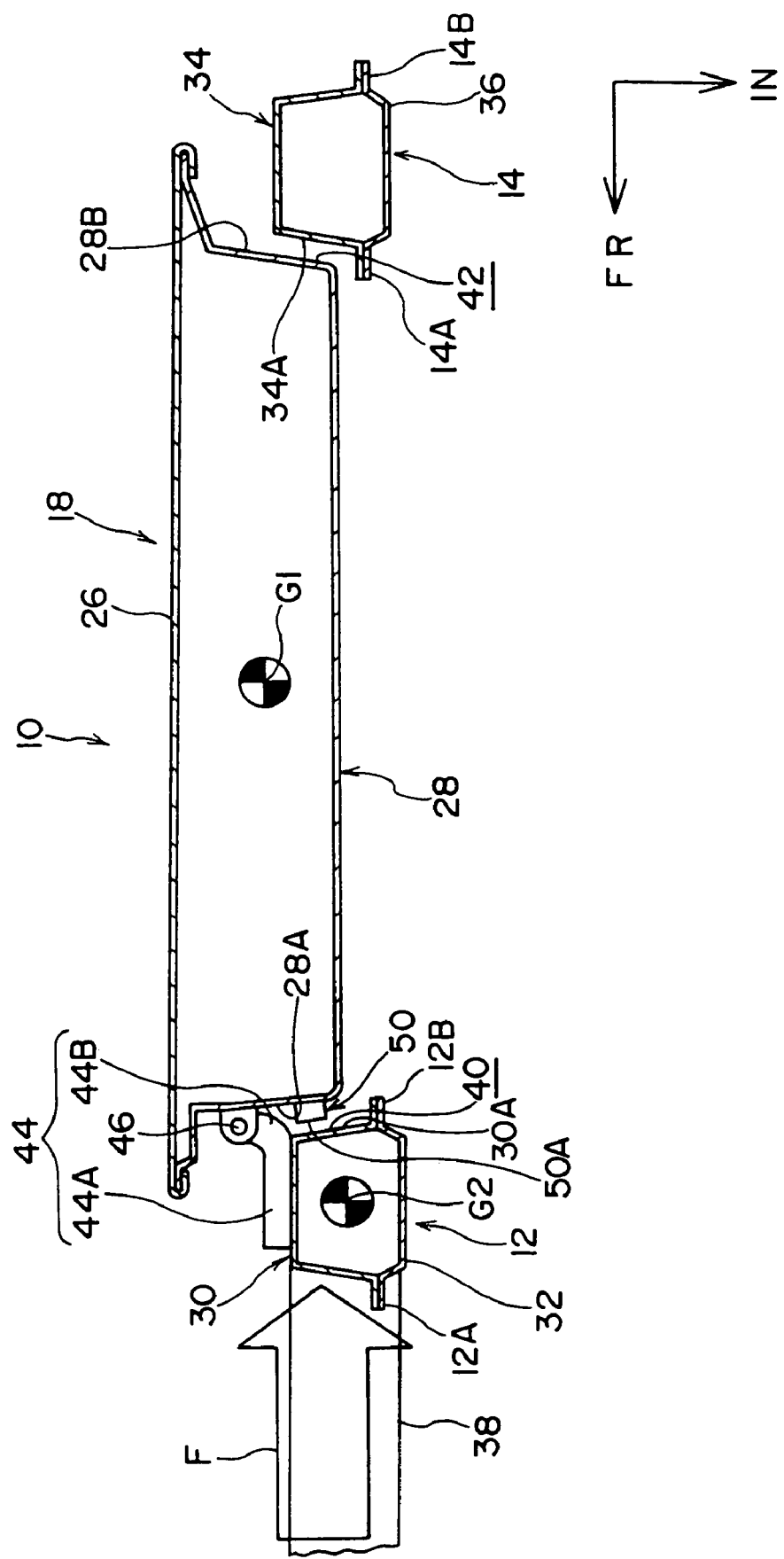
FIG. 5 is a cross-sectional drawing of the overall configuration of the vehicle body side structure according to a second embodiment of the present invention showing the state of the structure prior to a frontal collision.
Figure 6:
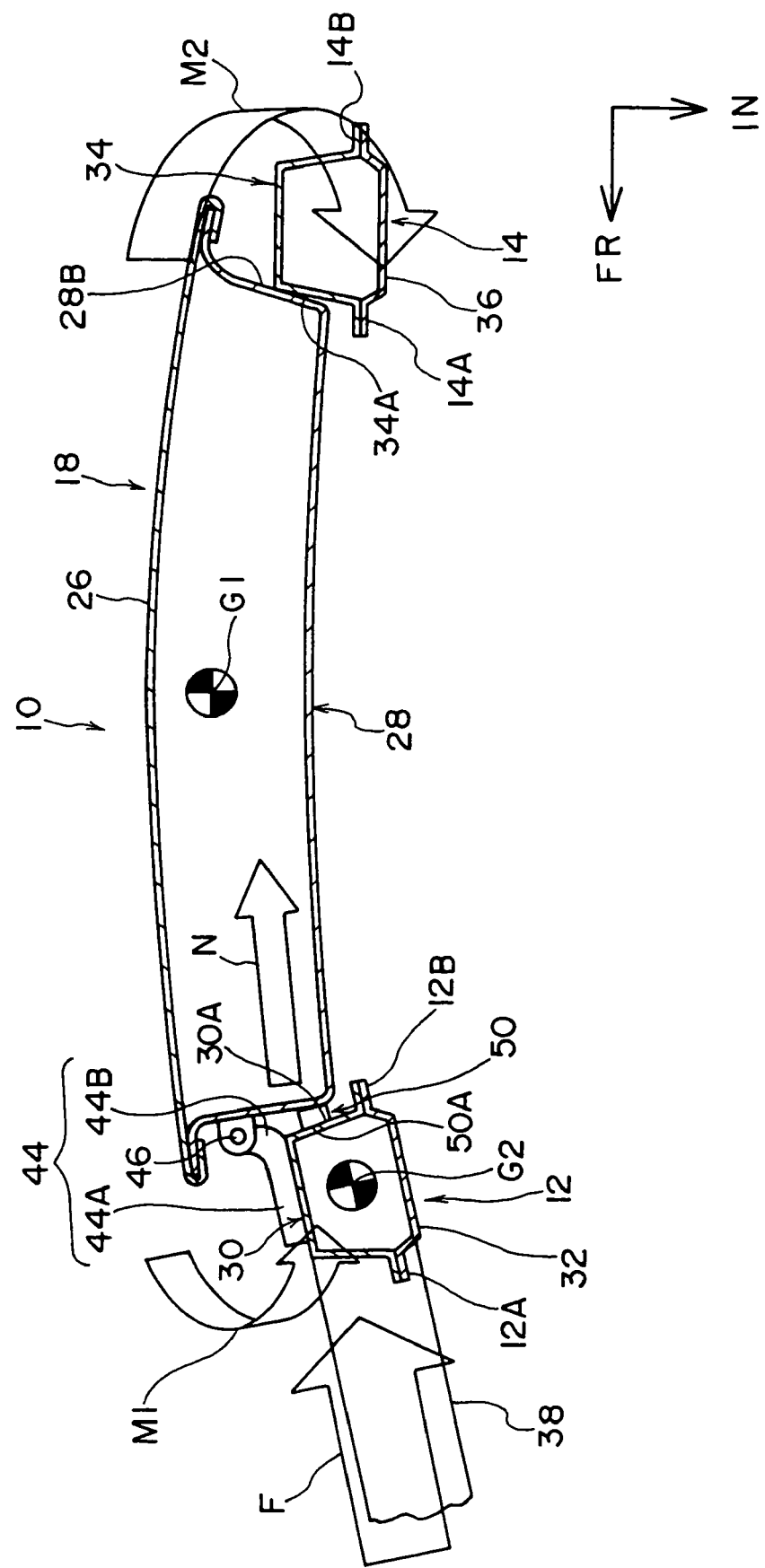
FIG. 6 is a cross-sectional drawing of the overall configuration of the vehicle body side structure according to a second embodiment of the present invention showing the state of the structure after a frontal collision.
Figure 7:
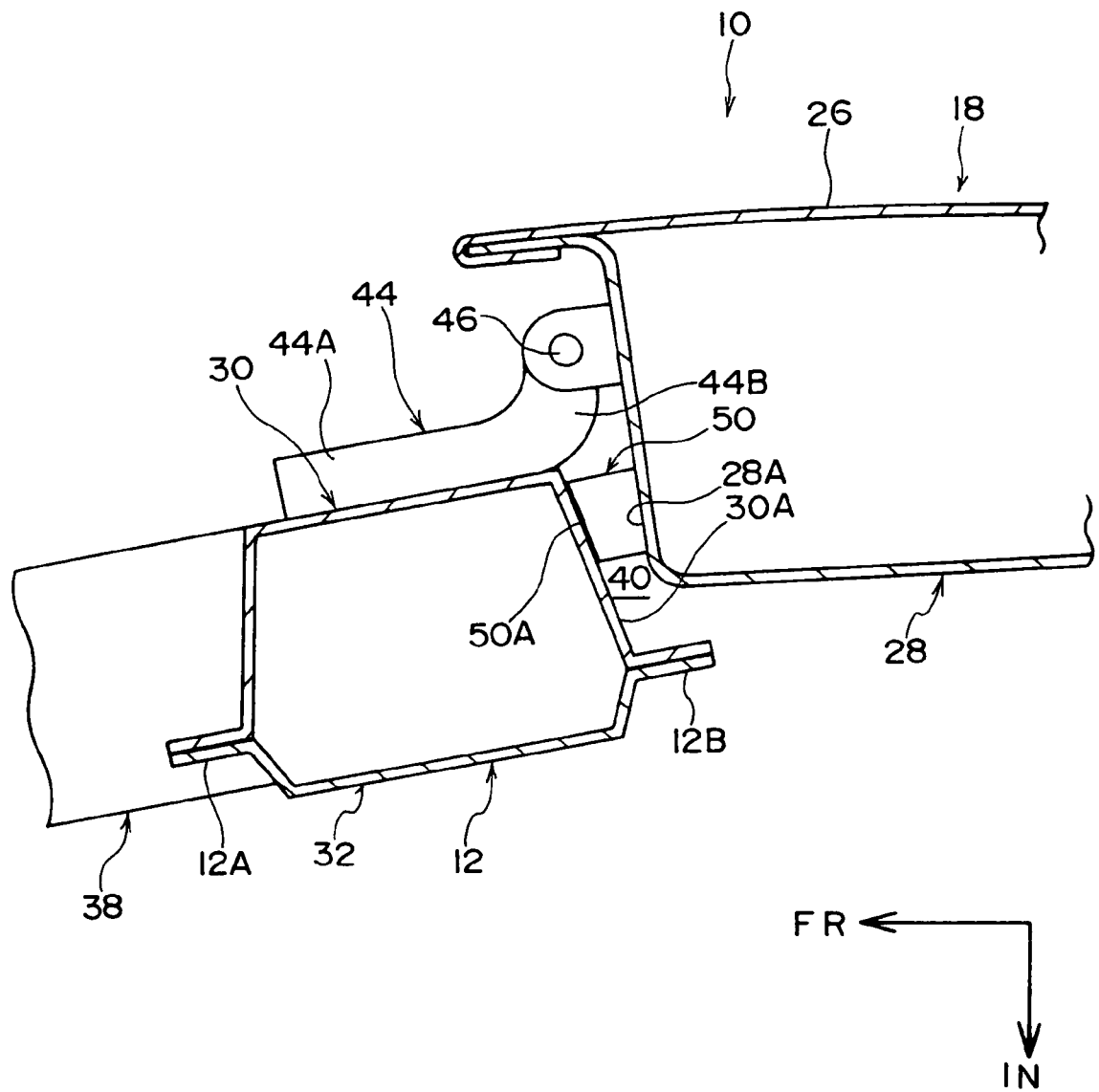
FIG. 7 is an enlarged cross-sectional drawing of the main portions of the second embodiment of the present invention shown in FIG. 6.

Hereafter, the second embodiment of the vehicle body side portion structure according to the present invention will be explained using FIGS. 5-7. It should be noted that those portions configured like those described in the first embodiment have been assigned the same numbers and explanations thereon have been omitted.

As shown in these drawings, the vehicle body side portion structure according to the second embodiment has a spacer-shaped load-conveying component 50 made to interpose in the gap 40 set between the rear end surface 30A of the front pillar 12 and the front surface 28A of the front side door 18.

To explain in further detail, the spacer-shaped load-conveying component 50 is fixed to the front surface 28A of the door inner panel 28 of the front side door 18 closer towards the side of the interior of the cab than the door hinge 44. The thickness of the load-conveying component 50 is set to be thinner than the gap measurement of the gap 40. Accordingly, during regular opening and closing of the door, the load-conveying component 50 does not interfere with the rear end surface 30A of the pillar outer panel 30 of the front pillar 12. Furthermore, when the front pillar 12 rotationally displaces around the hinge pin 46 of the door hinge 44 towards the interior of the vehicle by only a preset angle such that it does not hit, the front surface 50A of the load-conveying component 50 should be made to come in contact with the surface of the rear end surface 30A of the pillar outer panel 30, so this is set at an inclined surface of a preset angle.

With the above-described configuration, the spacer-shaped load-conveying component 50 is made to interpose in the gap 40 between the rear end surface 30A of the pillar outer panel 30 of the front pillar 12 and the front surface 28A of the door inner panel 28 of the front side door 18. Accordingly, when the front pillar 12 tries to rotationally displace around the hinge pin 46 of the door hinge 44 towards the interior of the cab, the rear end surface 30A of the front pillar 12 comes into contact with the front surface 50A of the load-conveying component 50 before the rear portion 44B of the door hinge 44 hits against the front surface 28A of the front side door 18, so the front pillar 12 cannot rotationally displace any more than that. Accordingly, at the time of a frontal collision, the bending moment M1 acting upon the front side door 18 is suppressed and the load of impact of that amount of moment is conveyed towards the rear side of the vehicle as axial force N. That is, with the present embodiment, a new load-conveying route that goes through the spacer-shaped load-conveying component 50 can be provided between the front pillar 12 and the front side door 18. As a result, with the present embodiment, vehicle frame deformation at the time of frontal collision can be effectively suppressed using a simple structure, as with the first embodiment.

Further, with the present embodiment, the load-conveying component 50 is configured in a spacer shape so as to interpose at the gap 40, so it is not necessary to secure a new space especially for providing the load-conveying component. As a result, a compact load-conveying component 50 can be established without sacrificing space in the inside of the vehicle cab and at an even lower cost.

Furthermore, as with the first embodiment, rotational displacement of the front pillar 12 can be stopped before it hits at the door hinge 44 so the generation of bending moment M1 at the front side door 18 can be suppressed and the ability to convey the force (i.e., channel the load) towards the rear of the vehicle as an axial force N is enhanced. As a result, the precision and reliability of effective suppression of vehicle frame deformation at the time of frontal collision can be enhanced.

Furthermore, as in the first embodiment, the load-conveying component 50 is arranged in the gap 40 closer to the inside of the cab interior than the door hinge 44 so the most appropriate configuration of the load-conveying component 50 (i.e., thickness, shape, etc.) can be selected to conform with the gap of the particular vehicle to which the invention is applied.

Also, as in the first embodiment, the load-conveying component 50 can be set without narrowing the gap 40 (here, "narrowing" refers to the fact that conventionally, the dimensions of the gap that are set must be narrowed for the components in order to provide the load-conveying component 50). For this reason, the load-conveying component 50 can be attached later without adding changes to the conventional side portion structure of a vehicle body at the design stage.

Furthermore, as in the first embodiment, the load-conveying component 50 of the present embodiment is set at a position along the door belt line 24 so deformation of the vehicle frame can be effectively suppressed.

It should be noted that with the present embodiment, the spacer-shaped load-conveying component 50 was provided at the front surface 28A of the door inner panel 28 of the front side door 18, however, this is not thus limited. A spacer-shaped load-conveying component can be provided at the rear end surface 30A of the pillar outer panel 30 of the front pillar 12. Further, load-conveying components can be provided at both the front surface 28A of the door inner panel 28 of the front side door 18 and at the rear end surface 30A of the pillar outer panel 30 of the front pillar 12, and the thicknesses of each of the load-conveying components can be made so as to be distributed between the front pillar 12 side and the front side door 18 side.

Further, with the present embodiment, the load-conveying component 50 was configured so as to be a separate component from the door inner panel 28, however, the present invention is not thus limited. For example, a load-conveying component can be provided so as to be unified with the door inner panel 28 by providing bulged protrusion at the front surface 28A of the door inner panel 28.

Third Embodiment

Figure 8:
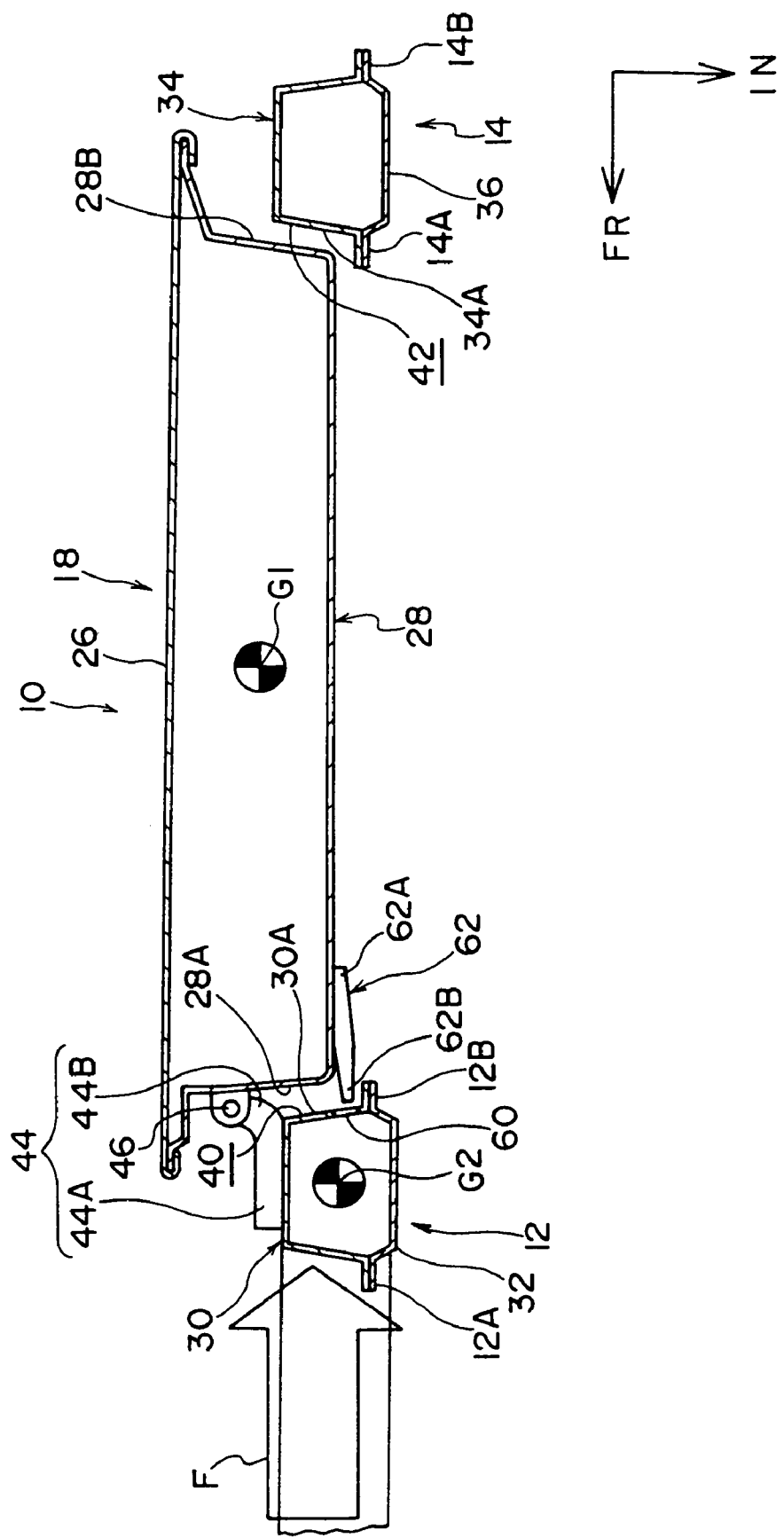
FIG. 8 is a cross-sectional drawing of the overall configuration of the vehicle body side structure according to a third embodiment of the present invention showing the state of the structure prior to a frontal collision.

Hereafter, the third embodiment of the vehicle body side portion structure according to the present invention will be explained using FIGS. 8-10. It should be noted that those portions configured like those described in the first embodiment have been assigned the same numbers and explanations thereon have been omitted.

As shown in these drawings, the vehicle body side portion structure 10 according to the third embodiment has a skewer-shaped load-conveying component 62 at the front side of the door inner panel 28 of the front side door 18 while an opening 60 is formed at the rear end surface 30A of the pillar outer panel 30 of the front pillar 12.

To explain in detail, an end (rear) portion 62A is fixed to the door inner panel 28 of the front side door 18 at the front side of the door inner panel 28. Another end (front) portion 62B of the long thin skewer-shaped load-conveying component 62 is set to protrude further towards the front side of the vehicle than the front surface 28A of the door inner panel 28. The front end portion 62B of the load-conveying component 62 is arranged closer to the external side of the vehicle cab than the rear end flange 12B of the front pillar 12.

Meanwhile, the opening 60 is formed into a shape (e.g., of a rectangle) in the rear end surface 30A of the pillar outer panel 30 of the front pillar 12 at a position that faces the other end portion 62B of the load-conveying component 62.

With the above-described configuration, in a state prior to a frontal collision, the other end portion 62B of the load-conveying component 62 is maintained at a position so as to be slightly separated from the opening 60 of the front pillar 12.

Figure 9:
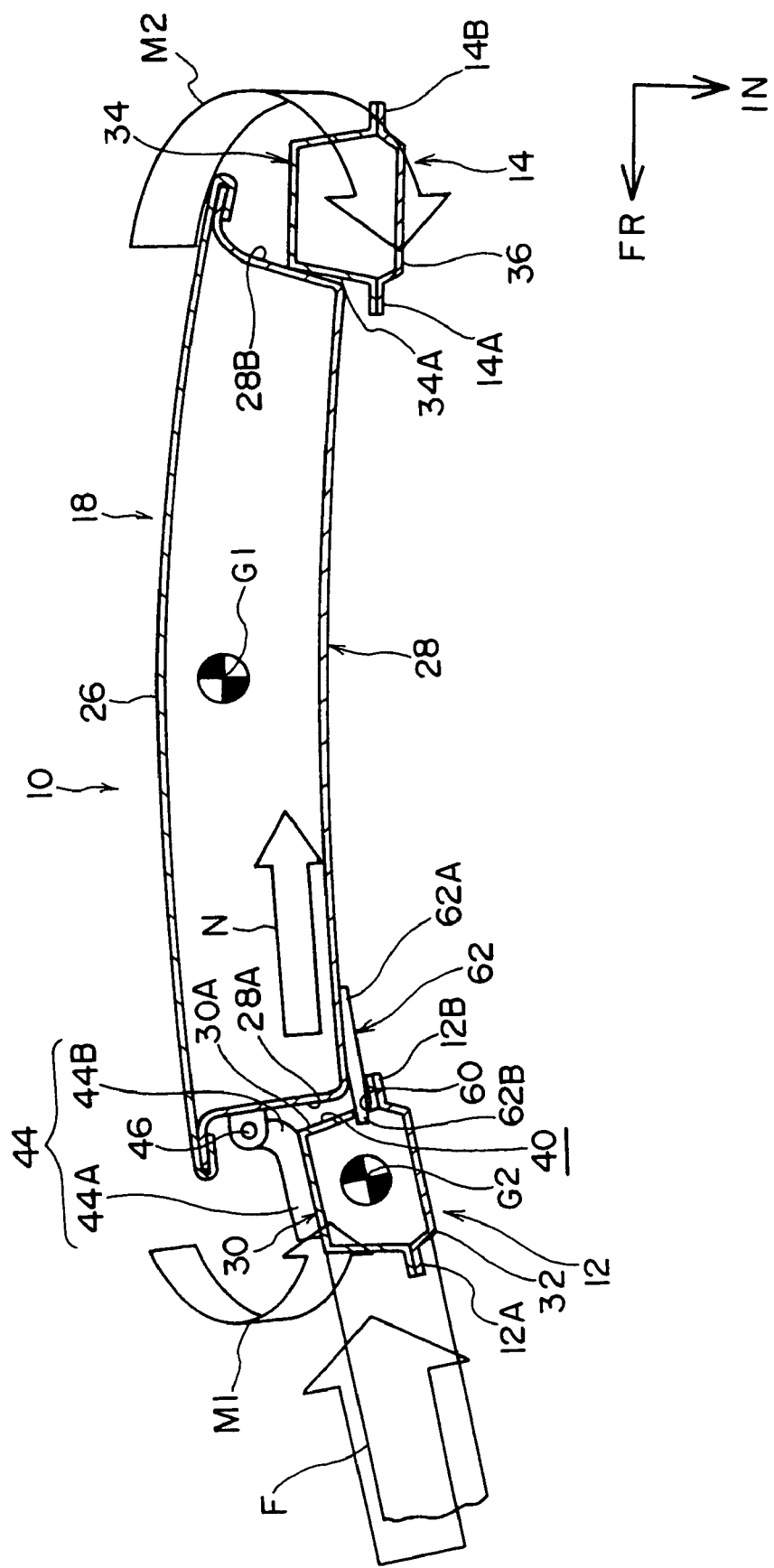
FIG. 9 is a cross-sectional drawing of the overall configuration of the vehicle body side structure according to a third embodiment of the present invention showing the state of the structure after a frontal collision.
Figure 10:
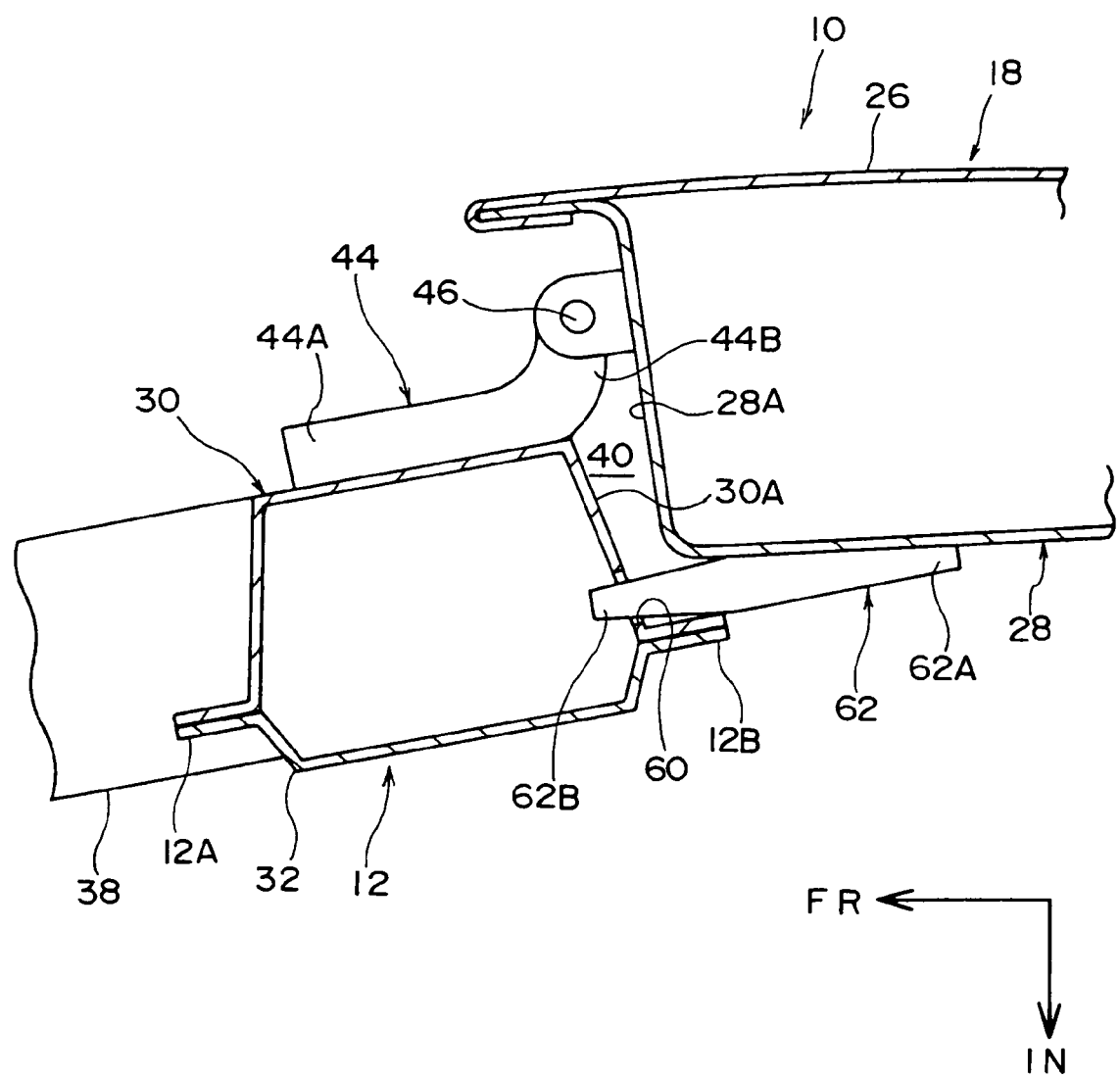
FIG. 10 is an enlarged cross-sectional drawing of the main portions of the third embodiment of the present invention shown in FIG. 9.

When, from this state, a frontal collision occurs, the front pillar 12 turns to rotationally displace around the around the hinge pin 46 of the door hinge 44 towards the interior of the vehicle cab due to a frontal load of impact F, as shown in FIG. 9. When this happens, the front end portion 62B of the load-conveying component 62 penetrates into the opening 60 formed in the rear end surface 30A of the front pillar 12 before the rear portion 44B of the door hinge 44 hits the front surface 28A of the front side door 18. Then, just when the other end portion 62B of the load-conveying component 62 bites into (i.e., enters) the peripheral edge portion of the opening 60 by a preset length, rotational displacement of the front pillar 12 is stopped (i.e., blocked). Accordingly, the bending moment M1 acting upon the front side door 18 at the time of a frontal collision can be suppressed and the load of impact can be conveyed towards the rear of the vehicle as an axial force N. That is, with the present embodiment, a new load-conveying route can be provided between the front pillar 12 and front side door 18 via the skewer-shaped load-conveying component 62. As a result, with the present embodiment, vehicle frame deformation at the time of a frontal collision can be effectively suppressed using a simple structure, as with the first embodiment.

Further, with the present embodiment, rotational displacement of the front pillar 12 is stopped before hitting at the door hinge 44, as in the first embodiment. For this reason, the generation of bending moment M1 towards the front side door 18 can be suppressed and the functional capability of conveying the moment (i.e., channeling the load) towards the rear side of the vehicle as axial force N is heightened. As a result, the precision and reliability of effective suppression of vehicle frame deformation at the time of a frontal collision can be increased.

Additionally, the present embodiment is configured so that the other end portion 62B of the load-conveying component 62 penetrates into and engages with the rear end surface 30A of the front pillar 12, so even if the front side door 18 tries to displace towards the exterior side in the widthwise direction of the vehicle, the front end portion 62B of the load-conveying component 62 is engaged with the opening 60 of the rear end surface 30A of the front pillar 12. For this reason, the present embodiment can also function in a frontal collision to suppress displacement of the front side door 18 towards the exterior side in the widthwise direction of the vehicle (i.e., movement in the side direction).

Furthermore, as with the first embodiment, the present embodiment is configured so that the load-conveying component 62 is arranged closer to the side of the cab interior than the door hinge 44, so the most appropriate configuration of the load-conveying component 62 (i.e., thickness, shape, etc.) can be selected to conform with the particular vehicle to which the invention is applied.

Further, with the present embodiment, the load-conveying component 62 can also be set without narrowing the gap 40, so this can be attached without adding changes to the conventional side structure of the vehicle body at the design stage.

Furthermore, as in the first embodiment, the load-conveying component 62 of the present embodiment is set at a position along the door belt line 24, so deformation of the vehicle frame can be effectively suppressed.

It should be noted that with the present embodiment described above, the opening 60 was formed as the portion to be engaged at the rear end surface 30A of the front pillar 12, however, the opening does not have to be this type of hole. For example, the opening can be a portion of low rigidity or a fragile area formed by a thin plate with an indentation therein or the like, through which the front end portion 62B of the load-conveying component 62 pierces.

Also, the examples of the above-described first through third embodiments were configured such that the load-conveying means was provided between the front pillar 12 and the front side door 18, however, the present invention is not thus limited. The load-conveying means of the present invention can also be provided between the center pillar 14 and the rear side door 20.

Also, in the above-described first through third embodiments, configurations were employed where a component restricts the rotational displacement of the front pillar 12 before the door hinge 44 hits the front surface 28A of the rear pillar 16, however, the present invention is not thus limited. The present invention can be configured such that it restricts rotational displacement of the front pillar 12 to a degree that it hits slightly but, when compared to conventional technologies, lessens the intensity of the hitting.

What is claimed is:

1. A vehicle side portion structure, which is applied to a vehicle body, comprising:
   a side door turnably supported around a door hinge attached to a pillar that is arranged at the side of a vehicle body and extends in the substantially up and down directions of the vehicle, said pillar having a rear flange;
   a preset gap between the surfaces of the pillar and the side door that face each other, and in which a centroid position of the cross-sectional surface of the side door is arranged so as to be offset towards the exterior side in the vehicle widthwise direction relative to a centroid position of the cross-sectional surface of the pillar; and
   a load-conveying component provided at the gap or in the vicinity thereof having an end surface facing the rear flange of the pillar that suppresses the rotational displacement of the pillar around the door hinge when a frontal collision load is input, said frontal collision load moving the end surface of the load-conveying component in a first direction into contact with the rear flange of the pillar, said contact preventing the load-conveying component from further movement in the first direction, thereafter forcing the frontal collision load to act upon the side door as an axial force towards the rear side of the vehicle.

2. The vehicle side portion structure of claim 1, wherein the load-conveying component is configured to block or dampen the door hinge hitting the door hinge side surface of the side door when the pillar rotationally displaces around the door hinge.

3. The vehicle side portion structure of claim 1, wherein the load-conveying component is arranged closer to the vehicle interior side than the door hinge.

4. The vehicle side portion structure of claim 1, wherein the load-conveying component is provided at a position along a door belt line.

5. The vehicle side portion structure of claim 1, wherein the load-conveying component is a bracket-shaped component provided at the front end side of a door inner panel of the side door, and has one end fixed to the door inner panel while the other end is arranged at the vehicle interior side of a rear end flange portion of the pillar.

6. The vehicle side portion structure of claim 2, wherein the load-conveying component is a bracket-shaped component provided at the front end side of a door inner panel of the side door, and has one end fixed to the door inner panel while the other end is arranged at the vehicle interior side of a rear end flange portion of the pillar.

7. The vehicle side portion structure of claim 3, wherein the load-conveying component is a bracket-shaped component provided at the front end side of a door inner panel of the side door, and has one end fixed to the door inner panel while the other end is arranged at the vehicle interior side of a rear end flange portion of the pillar.

8. The vehicle side portion structure of claim 4, wherein the load-conveying component is a bracket-shaped component provided at the front end side of a door inner panel of the side door, and has one end fixed to the door inner panel while the other end is arranged at the vehicle interior side of a rear end flange portion of the pillar.

9. The vehicle side portion structure of claim 1, wherein the load-conveying component is a spacer-shaped component interposed in the gap.

10. The vehicle side portion structure of claim 2, wherein the load-conveying component is a spacer-shaped component interposed in the gap.

11. The vehicle side portion structure of claim 3, wherein the load-conveying component is a spacer-shaped component interposed in the gap.

12. The vehicle side portion structure of claim 4, wherein the load-conveying component is a spacer-shaped component interposed in the gap.

13. The vehicle side portion structure of claim 1, wherein the load-conveying component is configured to include a skewer-shaped load-conveying component provided at the front end side of the door inner panel of the side door, and with one end portion thereof fixed to the door inner panel and the other end portion protruding towards the gap so as to be able to engage an engaging portion provided at the gap side end surface on the pillar, the load-conveying component blocking further rotational displacement of the pillar by engaging with the engaging portion.

14. The vehicle side portion structure of claim 2, wherein the load-conveying component is configured to include a skewer-shaped load-conveying component provided at the front end side of the door inner panel of the side door, and with one end portion thereof fixed to the door inner panel and the other end portion protruding towards the gap so as to be able to engage an engaging portion provided at the gap side end surface on the pillar, the load-conveying component blocking further rotational displacement of the pillar by engaging with the engaging portion.

15. The vehicle side portion structure of claim 3, wherein the load-conveying component is configured to include a skewer-shaped load-conveying component provided at the front end side of the door inner panel of the side door, and with one end portion thereof fixed to the door inner panel and the other end portion protruding towards the gap so as to be able to engage an engaging portion provided at the gap side end surface on the pillar, the load-conveying component blocking further rotational displacement of the pillar by engaging with the engaging portion.

16. The vehicle side portion structure of claim 4, wherein the load-conveying component is configured to include a skewer-shaped load-conveying component provided at the front end side of the door inner panel of the side door, and with one end portion thereof fixed to the door inner panel and the other end portion protruding towards the gap so as to be able to engage an engaging portion provided at the gap side end surface on the pillar, the load-conveying means blocking the rotational displacement past the pillar by engaging with the engaging portion.

17. A vehicle side portion structure, which is applied to a vehicle body, comprising:
   a side door turnably supported around a door hinge attached to a pillar that is arranged at the side of a vehicle body and which stands longitudinally in the substantially up and down directions of the vehicle, said pillar having a rear flange;
   a preset gap between the surfaces of the pillar and the side door that face each other, and in which a centroid position of the cross-sectional surface of the side door is arranged so as to be offset towards the exterior side in the vehicle widthwise direction relative to a centroid position of the cross-sectional surface of the pillar; and
   a load-conveying component provided at the gap or in the vicinity thereof having an end surface facing the rear flange of the pillar that suppresses the rotational displacement of the pillar around the door hinge when a frontal collision load is inputs, said frontal collision load moving the end surface of the load-conveying component in a first direction into contact with the rear flange of the pillar, said contact preventing the load-conveying component from further movement in the first direction, thereafter forcing the frontal collision load to act upon the side door as an axial force towards the rear side of the vehicle; wherein
   the load-conveying component is configured to block or dampen the door hinge hitting the door hinge side surface of the side door when the pillar rotationally displaces around the door hinge,
   the load-conveying component is arranged closer to the vehicle interior side than the door hinge, and
   the load-conveying component is provided at a position along the door belt line.

18. The vehicle side portion structure of claim 17, wherein the load-conveying component is a bracket-shaped component provided at the front end side of a door inner panel of the side door, and has one end fixed to the door inner panel while the other end is arranged at the vehicle interior side of a rear end flange portion of the pillar.

19. The vehicle side portion structure of claim 17, wherein the load-conveying component is a spacer-shaped component interposed in the gap.

20. The vehicle side portion structure of claim 17, wherein the load-conveying component is configured to include a skewer-shaped load-conveying component provided at the front end side of the door inner panel of the side door, and with one end portion thereof fixed to the door inner panel and the other end portion protruding towards the gap so as to be able to engage an engaging portion provided at the gap side end surface on the pillar, the load-conveying component blocking further rotational displacement of the pillar by engaging with the engaging portion.

* * * * *